United States Patent
Yoshikawa et al.

(10) Patent No.: US 12,084,386 B2
(45) Date of Patent: Sep. 10, 2024

(54) LAMINATION-SHAPED FIRED BODY, METHOD FOR PRODUCING LAMINATION-SHAPED FIRED BODY, AND KIT FOR PRODUCING LAMINATION-SHAPED FIRED BODY

(71) Applicant: Noritake Co., Limited, Nagoya (JP)

(72) Inventors: Daishi Yoshikawa, Nisshin (JP); Akihiro Okashimo, Nagakute (JP)

(73) Assignee: Noritake Co., Limited, Nagoya-Shit Aichi (JP)

( * ) Notice: Subject to any disclaimer, the term of this patent is extended or adjusted under 35 U.S.C. 154(b) by 506 days.

(21) Appl. No.: 17/242,057

(22) Filed: Apr. 27, 2021

(65) Prior Publication Data
US 2021/0246074 A1  Aug. 12, 2021

Related U.S. Application Data

(62) Division of application No. 15/685,882, filed on Aug. 24, 2017, now abandoned.

(30) Foreign Application Priority Data

Aug. 24, 2016  (JP) .................................. 2016-163571

(51) Int. Cl.
  *C04B 35/48*   (2006.01)
  *C04B 35/10*   (2006.01)
  (Continued)

(52) U.S. Cl.
  CPC .............. *C04B 35/48* (2013.01); *C04B 35/10* (2013.01); *C04B 35/111* (2013.01); *C04B 35/14* (2013.01);
  (Continued)

(58) Field of Classification Search
  CPC ....... C04B 35/48; C04B 35/46; C04B 35/636; C04B 135/486; C04B 35/111; C04B 35/14; C04B 35/10; C04B 35/632; C04B 35/64
  See application file for complete search history.

(56) References Cited

U.S. PATENT DOCUMENTS

2005/0237695 A1* 10/2005 Kanada ............... C04B 35/6262
                                                                361/321.5
2009/0252924 A1   10/2009 Kamikoriyama et al.
(Continued)

FOREIGN PATENT DOCUMENTS

JP   S55141504 U   10/1980
JP   S63264686 A   11/1988
(Continued)

OTHER PUBLICATIONS

U.S. Appl. No. 15/685,882, Final Office Action mailed Dec. 21, 2020, 10 pgs.
(Continued)

*Primary Examiner* — Mathieu D Vargot
(74) *Attorney, Agent, or Firm* — Schwegman Lundberg & Woessner. P.A.

(57) ABSTRACT

The present invention provides a method for producing a lamination-shaped fired body. This production method includes a shaping step (S10) of shaping a lamination-shaped article by using a lamination shaping powder that contains non-hydrating reaction raw material particles, an impregnation step (S20) of impregnating the lamination-shaped article with a coupling liquid that contains a coupling agent, and a firing step (S30) of firing the lamination-shaped article so as to obtain a lamination-shaped fired body, implemented following the impregnation step.

5 Claims, 1 Drawing Sheet

(51) Int. Cl.

| | |
|---|---|
| *C04B 35/111* | (2006.01) |
| *C04B 35/14* | (2006.01) |
| *C04B 35/46* | (2006.01) |
| *C04B 35/486* | (2006.01) |
| *C04B 35/632* | (2006.01) |
| *C04B 35/634* | (2006.01) |
| *C04B 35/636* | (2006.01) |
| *C04B 35/64* | (2006.01) |

(52) U.S. Cl.
CPC ............ *C04B 35/46* (2013.01); *C04B 35/486* (2013.01); *C04B 35/632* (2013.01); *C04B 35/6325* (2013.01); *C04B 35/63416* (2013.01); *C04B 35/636* (2013.01); *C04B 35/64* (2013.01); *C04B 2235/3217* (2013.01); *C04B 2235/3232* (2013.01); *C04B 2235/3244* (2013.01); *C04B 2235/3418* (2013.01); *C04B 2235/48* (2013.01); *C04B 2235/483* (2013.01); *C04B 2235/5436* (2013.01); *C04B 2235/602* (2013.01); *C04B 2235/606* (2013.01); *C04B 2235/616* (2013.01); *C04B 2235/6562* (2013.01); *C04B 2235/6567* (2013.01); *C04B 2235/85* (2013.01); *C04B 2235/96* (2013.01)

(56) References Cited

U.S. PATENT DOCUMENTS

| | | |
|---|---|---|
| 2015/0111012 A1 | 4/2015 | Egashira et al. |
| 2015/0306657 A1 | 10/2015 | Frank |
| 2015/0328678 A1 | 11/2015 | Mcnulty et al. |
| 2017/0062856 A1 | 3/2017 | Ohmori et al. |
| 2017/0283649 A1 | 10/2017 | Fukaumi et al. |
| 2018/0057411 A1 | 3/2018 | Yoshikawa et al. |

FOREIGN PATENT DOCUMENTS

| | | |
|---|---|---|
| JP | 2001162351 A | 6/2001 |
| JP | 2015226935 A | 12/2015 |
| WO | WO-2015108768 A1 | 7/2015 |
| WO | WO-2016098596 A1 | 6/2016 |
| WO | WO-2016186609 A1 | 11/2016 |

OTHER PUBLICATIONS

U.S. Appl. No. 15/685,882, Non Final Office Action mailed Jan. 24, 2020, 10 pgs.
U.S. Appl. No. 15/685,882, Non Final Office Action mailed Jun. 25, 2020, 9 pgs.
U.S. Appl. No. 15/685,882, Response filed Apr. 21, 2021 to Final Office Action mailed Dec. 21, 2020, 7 pgs.
U.S. Appl. No. 15/685,882, Response filed May 19, 2020 to Non Final Office Action mailed Jan. 24, 2020, 11 pgs.
U.S. Appl. No. 15/685,882, Response filed Sep. 11, 2020 to Non Final Office Action mailed Jun. 25, 2020, 9 pgs.
U.S. Appl. No. 15/685,882, Response filed Dec. 16, 2019 to Restriction Requirement mailed Nov. 15, 2019, 5 pgs.
U.S. Appl. No. 15/685,882, Restriction Requirement mailed Nov. 15, 2019, 9 pgs.
"U.S. Appl. No. 15/685,882, Response filed Feb. 22, 2022 to Non Final Office Action mailed Sep. 28, 2021", 7 pgs.
"U.S. Appl. No. 15/685,882, Final Office Action mailed May 27, 2022", 9 pgs.
Bonet, Alexander, "Additive Manufacturing of Ceramic-Based Materials", Advanced Engineering Materials, 16, No. 6, (2014), 729-754.
"U.S. Appl. No. 15/685,882, Advisory Action mailed May 3, 2021", 3 pgs.
"U.S. Appl. No. 15/685,882, Non Final Office Action mailed Sep. 28, 2021", 9 pgs.

* cited by examiner

FIG. 1

LAMINATION-SHAPED FIRED BODY, METHOD FOR PRODUCING LAMINATION-SHAPED FIRED BODY, AND KIT FOR PRODUCING LAMINATION-SHAPED FIRED BODY

BACKGROUND OF THE INVENTION

1. Field of the Invention

The present invention relates to a lamination-shaped fired body, a method for producing a lamination-shaped fired body, and a kit for producing a lamination-shaped fired body.

The present application is a divisional of and claims the benefit of priority under 35 U.S.C. § 120 to U.S. patent application Ser. No. 15/685,882, filed on Aug. 24, 2017, now abandoned, which claims priority under 35 U.S.C. § 119 to Japanese Patent Application No. 2016-163571, which was filed on 24 Aug. 2016, and the entire contents of each of which are incorporated by reference in the present specification.

2. Description of the Related Art

In the past, additive manufacturing (also known as three-dimensional manufacturing) has been known, in which a shaped article having a desired three-dimensional shape is shaped by binding a powder material by means of a binder and forming a solidified powder layer having a prescribed cross sectional shape. Due to ease of handling, this additive manufacturing is widely carried out for manufacturing resin products obtained using resin materials. However, additive manufacturing of powder materials (powder lamination shaping) is also widely used for powder materials comprising ceramic materials, for which precision processing following shaping is difficult. Japanese Patent Application Publication No. 2015-226935 is cited as an example of a technical document relating to lamination shaping of this type of ceramic material.

SUMMARY OF THE INVENTION

Japanese Patent Application Publication No. 2015-226935 discloses shaping a lamination-shaped article (a ceramic casting core in this case) using a lamination shaping powder that contains a ceramic powder and a binder, and then firing the lamination-shaped article at a high temperature. This document indicates that by being constituted in this way, it is possible to obtain a lamination-shaped article which has adequate core strength and other associated fired physical and chemical properties. However, even if such a constitution is used, the mechanical strength of a lamination-shaped article is insufficient to satisfy levels required in recent years, and there is still room for improvement.

With these circumstances in mind, the main purpose of the present invention is to provide a method for producing a lamination-shaped fired body by which the mechanical strength of a lamination-shaped article can be improved. A related purpose of the present invention is to provide a kit for producing a lamination-shaped fired body able to contribute to such an increase in strength.

In order to achieve the purposes mentioned above, the present invention provides a method for producing a lamination-shaped fired body. The production method disclosed here includes: a shaping step of shaping a lamination-shaped article by using a lamination shaping powder that contains non-hydrating reaction raw material particles; an impregnation step of impregnating the lamination-shaped article with a coupling liquid that contains a coupling agent; and a firing step of firing the lamination-shaped article so as to obtain a lamination-shaped fired body, implemented following the impregnation step.

By impregnating a lamination-shaped article with a coupling liquid and then firing in this way, the mechanical strength of a lamination-shaped fired body can be greatly improved.

In a preferred aspect of the invention disclosed here, the coupling agent contains at least one element selected from the group consisting of Si, Ti, Al and Zr. By using such a coupling agent, greater mechanical strength can be achieved.

In a preferred aspect of the invention disclosed here, the non-hydrating reaction raw material particles are constituted mainly from a metal containing at least one element selected from the group consisting of Al, Zr, Ti, Zn, Ni and Fe or an alloy thereof. By using these non-hydrating reaction raw material particles in combination with the coupling agent, a lamination-shaped fired body having greater strength can be obtained.

In a preferred aspect of the invention disclosed here, the non-hydrating reaction raw material particles are constituted mainly from an oxide containing at least one element selected from the group consisting of Al, Zr, Ti, Zn, Ni, Fe and Si. By using these non-hydrating reaction raw material particles in combination with the coupling agent, a lamination-shaped fired body having greater strength can be obtained.

In a preferred aspect of the invention disclosed here, the lamination shaping powder further contains water-soluble adhesive particles. In addition, the step of shaping the lamination-shaped article includes processing of supplying a water-containing shaping liquid to a deposit of the lamination shaping powder so as to form a hardened layer. The advantageous effect of the present invention can be more advantageously exhibited in a method for producing a lamination-shaped fired body that includes a shaping step that uses a shaping liquid containing water-soluble adhesive particles and water in this way.

In a preferred aspect of the invention disclosed here, the water-soluble adhesive particles comprise poly(vinyl alcohol) or a derivative thereof. By using such water-soluble adhesive particles, the production method disclosed here can be advantageously carried out.

According to this specification, a kit which is used to produce a lamination-shaped fired body obtained by firing a lamination-shaped article is also provided. This production kit includes a lamination shaping powder that contains non-hydrating reaction raw material particles, and a coupling liquid which contains a coupling agent and which is impregnated in an unfired lamination-shaped article that is shaped using the lamination shaping powder. By using such a production kit, it is possible to produce a high quality lamination-shaped fired body having superior mechanical strength to the prior art.

The coupling agent may contain at least one element selected from the group consisting of Si, Ti, Al and Zr. The non-hydrating reaction raw material particles may be constituted mainly from a metal containing at least one element selected from the group consisting of Al, Zr, Ti, Zn, Ni and Fe or an alloy thereof. The non-hydrating reaction raw material particles may be constituted mainly from an oxide containing at least one element selected from the group consisting of Al, Zr, Ti, Zn, Ni, Fe and Si. The lamination shaping powder may further contain water-soluble adhesive particles. The water-soluble adhesive particles comprise poly(vinyl alcohol) or a derivative thereof.

According to this specification, a lamination-shaped fired body is also provided. This lamination-shaped fired body is formed by a multiplicity of non-hydrating reaction raw material particles binding to each other. The non-hydrating reaction raw material particles contain at least one element selected from the group consisting of Al, Zr, Ti. Zn, Ni, Fe and Si. An oxide containing at least one element selected from the group consisting of Si, Ti, Al and Zr, other than elements contained in the non-hydrating reaction raw material particles, is present at grain boundaries between non-hydrating reaction raw material particles. This lamination-shaped fired body can achieve excellent mechanical strength.

DETAILED DESCRIPTION OF THE INVENTION

Preferred embodiments of the present invention will now be explained. Moreover, matters which are essential for carrying out the invention and which are matters other than those explicitly mentioned in the present specification are matters that a person skilled in the art could understand to be matters of design on the basis of the prior art in this technical field. The present invention can be carried out on the basis of the matters disclosed in the present specification and common general technical knowledge in this technical field.

The lamination shaping powder disclosed here, which contains non-hydrating reaction raw material particles, forms a hardened layer (a solidified powder layer) having a prescribed cross sectional shape as a result of the powder being bound by a binder, and by forming this hardened layer while sequentially laminating, the lamination shaping powder can be used in a variety of types of additive manufacturing in which lamination-shaped articles having prescribed three-dimensional shapes are shaped. It is particularly preferable to use the lamination shaping powder in additive manufacturing involving the use of a powder fixing lamination method for forming a lamination-shaped article by depositing a lamination shaping powder in the form of a thin layer, forming a hardened layer by mixing a water-containing shaping liquid with a prescribed region of the deposit and repeatedly forming hardened layers. The present invention will now be explained in greater detail using an example of a case in which additive manufacturing involving the use of mainly a powder fixing lamination method is carried out, but the scope of the present invention is not limited thereto. For example, the present invention can also be used in an optical shaping technique in which a lamination-shaped article is shaped by hardening a slurry, which is obtained by mixing non-hydrating reaction raw material particles with a photocurable resin, through irradiation with light.

Figure 1:
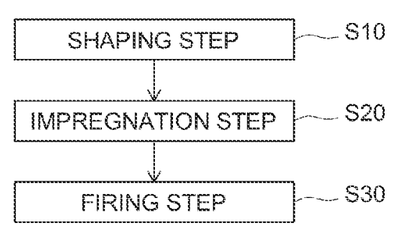
FIG. 1 is a diagram that shows a production flow of a lamination-shaped fired body according to one embodiment.

A procedure for producing a lamination-shaped fired body will now be explained with reference to FIG. 1. FIG. 1 is a flow diagram showing this production process. The production method of this embodiment has a shaping step (step S10), an impregnation step (step S20) and a firing step (step S30).

Here, the shaping step of step S10 comprises shaping a lamination-shaped article using a lamination shaping powder that contains non-hydrating reaction raw material particles. The impregnation step of step S20 comprises impregnating the lamination-shaped article, which is shaped in the shaping step, with a coupling liquid that contains a coupling agent. The firing step of step S30 comprises firing the lamination-shaped article so as to obtain a lamination-shaped fired body. By impregnating the lamination-shaped article with the coupling liquid and then firing in this way, the mechanical strength of the lamination-shaped fired body can be greatly improved. These steps will now be explained in greater detail.

Molding Step

In the shaping step of step S10, a lamination-shaped article is shaped using a lamination shaping powder that contains non-hydrating reaction raw material particles. In this embodiment, a lamination shaping powder that contains non-hydrating reaction raw material particles and water-soluble adhesive particles is prepared, and a lamination-shaped article is shaped by means of a powder fixing lamination method using this lamination shaping powder. Here, the term "non-hydrating reaction raw material particles" in the present specification means a substance which, when the particles come into contact with water, does not undergo a hydration reaction (typically generation of a hydrate or generation of a hydroxide) or, if the substance does undergo a hydration reaction, the hydration reaction is limited to only a microscopic region of the surface of the particles, with the majority of the particles substantially not reacting with water. Therefore, a case in which, for example, a trace quantity (for example, 0.1 moles or less, preferably 0.01 moles or less, and more preferably 0.001 moles or less) locally reacts with 1 mole of non-hydrating reaction raw material particles at particle surfaces can be encompassed by the concept of non-hydrating reaction raw material particles mentioned here. Gypsum and cement can be given as typical examples of substances that undergo hydration reactions. The non-hydrating reaction raw material particles are a component that constitutes the base material of the lamination-shaped article that is an object to be shaped.

The constituent material and shape of the non-hydrating reaction raw material particles are not particularly limited. For example, the non-hydrating reaction raw material particles may be inorganic particles, organic particles or organic-inorganic composite particles. The non-hydrating reaction raw material particles are preferably inorganic particles and, of these, are preferably particles comprising a metal or metalloid compound. For example, non-hydrating reaction raw material particles constituted mainly from an oxide, nitride, carbide, or the like, containing elements belonging to groups 4 to 14 of the periodic table can be advantageously used. Of these, non-hydrating reaction raw material particles constituted mainly from an oxide (a ceramic), nitride, carbide, or the like, containing metal elements or metalloid elements selected from among Al, Zr, Ti, Zn, Ni, Fe and Si are preferred. Alternatively, it is possible to use non-hydrating reaction raw material particles constituted mainly from a metal containing elements belonging to groups 4 to 13 of the periodic table or an alloy of these elements. Of these, non-hydrating reaction raw material particles constituted mainly from a metal containing metal elements selected from among Al, Zr, Ti, Zn, Ni and Fe or an alloy of these elements are preferred.

Specific examples include non-hydrating reaction raw material particles constituted mainly from oxide particles such as aluminum oxide (for example, alumina) particles, zirconium oxide (for example, zirconia) particles, titanium oxide (for example, titania) particles, silicon oxide (for example, silica) particles, zinc oxide particles, iron oxide particles, nickel oxide particles, cerium oxide (for example, ceria) particles, magnesium oxide (for example, magnesia) particles, chromium oxide particles, manganese dioxide particles, barium titanate particles, calcium carbonate particles and barium carbonate particles; metal particles such as aluminum particles, nickel particles and iron particles; nitride particles such as silicon nitride particles and boron nitride particles: and carbide particles such as silicon carbide particles and boron carbide particles. It is possible to use one type of non-hydrating reaction raw material particles in isolation, or a combination of two or more types thereof. Of these, alumina particles, zirconia particles, titania particles, silica particles, zinc oxide particles, barium titanate particles, aluminum particles, nickel particles and iron particles are preferred from the perspective of being able to form a highly strong three-dimensional shaped article. Of these, alumina particles, zirconia particles, titania particles and silica particles are more preferred, and alumina particles are particularly preferred.

Moreover, in the present specification, the expression "constituted mainly from A" with respect to the composition of the non-hydrating reaction raw material particles means that the proportion of A (the purity of A) in the non-hydrating reaction raw material particles is 90% or more (preferably 95% or more, more preferably 97% or more and further preferably 98% or more, for example 99% or more) in terms of mass.

The shape (external shape) of the non-hydrating reaction raw material particles may be spherical or non-spherical. From perspectives such as mechanical strength and case of production, roughly spherical non-hydrating reaction raw material particles can be advantageously used. The average particle diameter of the non-hydrating reaction raw material particles is not particularly limited, but can be, for example, not less than 5 µm and not more than 60 µm. If the average particle diameter of the non-hydrating reaction raw material particles is too low, the lamination shaping powder becomes unlikely to flow, meaning that moldability may deteriorate when the powder is packed in the form of a thin layer during shaping. From perspectives such as moldability, the average particle diameter of the non-hydrating reaction raw material particles is preferably not less than 10 µm, more preferably not less than 20 µm, and particularly preferably not less than 30 µm (for example, not less than 40 µm). In addition, the average particle diameter of the non-hydrating reaction raw material particles is not more than approximately 60 µm. If the average particle diameter of the non-hydrating reaction raw material particles is too high, the powder readily flows after being packed in the form of a thin layer during shaping, meaning that layers in the lamination-shaped article may undergo lamination slipping. From perspectives such as suppressing lamination slipping, the average particle diameter of the non-hydrating reaction raw material particles is preferably not more than 55 µm, more preferably not more than 50 µm, and particularly preferably not more than 45 µm. For example, non-hydrating reaction raw material particles in which the average particle diameter is such that 10 µm≤X≤50 µm (and typically 30 µm≤ X≤ 50 µm) are preferred from the perspective of achieving moldability while suppressing lamination slipping.

Moreover, the term "average particle diameter" in the present specification, unless explicitly stated otherwise, means the particle diameter at a cumulative value of 50% in a particle size distribution measured using a laser scattering/diffraction type particle size distribution measurement apparatus, that is, the 50% volume average particle diameter (D50 diameter). More specifically, this average particle diameter is the 50% volume average particle diameter measured by means of a dry method using a laser scattering/diffraction type particle size distribution measurement apparatus, without dispersing particles by means of compressed air.

The content of non-hydrating reaction raw material particles in the lamination shaping powder is not particularly limited. The content of non-hydrating reaction raw material particles is generally not less than 60 parts by mass relative to a total of 100 parts by mass of the lamination shaping powder, and from perspectives such as improving mechanical strength, is preferably not less than 65 parts by mass, more preferably not less than 75 parts by mass, for example not less than 80 parts by mass, and is typically not less than 85 parts by mass, for example not less than 90 parts by mass. The upper limit for the content of the non-hydrating reaction raw material particles is not particularly limited, but is preferably not more than 99 parts by mass, and more preferably not more than 98 parts by mass, for example not more than 96 parts by mass. If the content of non-hydrating reaction raw material particles falls within a range such as that mentioned above, the advantageous effect of the present invention can be exhibited at a significantly higher level.

The lamination shaping powder disclosed here contains water-soluble adhesive particles in addition to the non-hydrating reaction raw material particles mentioned above. In the present specification, the term "water-soluble adhesive particles" means that when 2 parts by mass of adhesive particles are added to 100 parts by mass of water having a temperature of 90° C. and stirred for 4 hours, all or some of the adhesive particles dissolve, and the aqueous solution in which the adhesive particles are dissolved has a higher viscosity than water. In a preferred aspect, in cases where the water is deemed to have a viscosity of A (mPa·s), the viscosity of an aqueous solution in which the adhesive particles are dissolved has a viscosity that is more than 1.2×A (preferably 1.5×A, and more preferably 2.0×A). The water-soluble adhesive particles are a component which, when mixed with a water-containing shaping liquid, dissolve in the water and bind non-hydrating reaction raw material particles to each other.

The constituent material and shape of the water-soluble adhesive particles are not particularly limited. For example, water-soluble adhesive particles constituted mainly from thermoplastic resins, thermosetting resins and polysaccharides can be advantageously used.

Preferred examples of thermoplastic resins include vinyl alcohol-based resins, isobutylene-based resins, polyamide-based resins and polyester-based resins. Vinyl alcohol-based resins are typically resins containing vinyl alcohol units as primary repeating units (PVA resins). In such resins, the ratio of the number of moles of vinyl alcohol units relative to the number of moles of all repeating units is generally not less than 50% (for example, 50% to 90%), and is preferably not less than 65%, and more preferably not less than 75%, for example not less than 85%. It is possible for substantially all of the repeating units to be constituted from vinyl alcohol units. In PVA resins, repeating units other than vinyl alcohol units are not particularly limited, and may include, for example, vinyl acetate units. Anion-modified and cation-modified PVA resins, such as carboxyl group-modified PVA resins, sulfonic acid group-modified PVA resins and phosphoric acid group-modified PVA resins, and modified PVA resins obtained by copolymerizing ethylene, vinyl ethers having long chain alkyl groups, vinyl esters, (meth)acrylamide, α-olefins, and the like, may be used. The degree of polymerization of the PVA is not particularly limited, but may be, for example, 100 to 5000 (and preferably 500 to 3000). An isobutylene-based resin may be a homopolymer of isobutylene or a copolymer of isobutylene and another monomer (an isobutylene copolymer). In the case of isobutylene copolymers, other monomers to be copolymerized with isobutylene are not particularly limited. For example, it is possible to use a monomer having an ethylenic double bond. Examples of monomers having ethylenic double bonds include ethylenically unsaturated carboxylic acids such as maleic acid (anhydride), acrylic acid, methacrylic acid, phthalic acid (anhydride) and itaconic acid (anhydride). Chemically modified isobutylene copolymers may be used. The molecular weight of an isobutylene copolymer is not particularly limited, but may be, for example, $3 \times 10^3$ to $2 \times 10^5$ (and preferably $5 \times 10^3$ to $1.7 \times 10^5$). Examples of polyamide-based resins include water-soluble nylon resins obtained by chemically modifying nylon resins such as polycaproamide (nylon-6). Examples of polyester-based resins include water-soluble polyesters obtained by introducing hydrophilic group-containing components as copolymer components in polyesters. Of these, thermoplastic resins, vinyl alcohol-based resins and isobutylene-based resins can be advantageously used from the perspective of adhesive strength.

Preferred examples of thermosetting resins include melamine-based resins. A melamine resin may be a melamine resin obtained by means of a polymerization reaction between melamine and an aldehyde, but may also be a copolymer resin of a monomer used to form a melamine resin (or an initial polymer thereof) and another monomer (or an initial polymer thereof). In the case of a melamine resin, the type of aldehyde to be polymerized with melamine is not particularly limited. For example, a melamine resin obtained by means of a polymerization reaction between melamine and formaldehyde can be advantageously used.

Preferred examples of polysaccharides include cellulose derivatives such as hydroxypropylmethyl cellulose, hydroxyethylmethyl cellulose, hydroxyethyl cellulose, hydroxypropyl cellulose, methyl cellulose, ethyl cellulose, ethylhydroxyethyl cellulose and carboxymethyl cellulose; and natural polymeric compounds such as gum Arabic, xanthan gum, curdlan, starch, dextrin, glucomannan, agarose, carrageenan, guar gum, locust bean gum, gum tragacanth, quince seed gum, pullulan, agar and konjak mannan. Of these, hydroxypropylmethyl cellulose, hydroxyethylmethyl cellulose, methyl cellulose, gum Arabic and xanthan gum can be advantageously used from perspectives such as adhesive properties.

Examples of water-soluble adhesive particles able to be contained in the lamination shaping powder disclosed here include water-soluble adhesive particles constituted mainly from polyethylene glycol, partially neutralized sodium polyacrylate, polyvinylpyrrolidone, polyvinylpyrrolidone copolymers, sodium polyacrylate, sodium polyacrylate copolymers, sodium alginate, sucrose, dextrose, fructose, lactose, gelatin, and the like. It is possible to use one type of water-soluble adhesive particles mentioned above in isolation, or a combination of two or more types thereof.

Moreover, in the present specification, the expression "constituted mainly from A" with respect to the composition of the water-soluble adhesive particles means that the proportion of A (the purity of A) in the water-soluble adhesive particles is 90% or more (preferably 95% or more, more preferably 97% or more, and further preferably 98% or more, for example 99% or more) in terms of mass.

The average particle diameter of the water-soluble adhesive particles is not particularly limited, but is generally not less than 0.1 µm, and preferably not less than 1 µm. A suitable upper limit for the average particle diameter of the water-soluble adhesive particles is not more than approximately 250 µm, and preferably not more than 200 µm.

The content of water-soluble adhesive particles in the lamination shaping powder is not particularly limited. The content of water-soluble adhesive particles is generally not less than 1 part by mass relative to a total of 100 parts by mass of the lamination shaping powder, and from perspectives such as improving mechanical strength, is preferably not less than 2 parts by mass, such as not less than 4 parts by mass, and is typically not less than 8 parts by mass. The upper limit for the content of the water-soluble adhesive particles is not particularly limited, but is, for example, not more than 40 parts by mass, and from perspectives such as improving mechanical strength, is preferably not more than 35 parts by mass, for example not more than 30 parts by mass, for example not more than 20 parts by mass, and is typically not more than 15 parts by mass, for example not more than 10 parts by mass.

In the invention disclosed here, the water-soluble adhesive particles and non-hydrating reaction raw material particles may be present as independent particles without being bonded to each other. By causing the water-soluble adhesive particles and non-hydrating reaction raw material particles to be present as independent particles in this way, a desired lamination shaping powder can be easily obtained. Alternatively, water-soluble adhesive particles may be attached to the surface of non-hydrating reaction raw material particles. That is, some or all of the non-hydrating reaction raw material particles may be coated with water-soluble adhesive particles. By constituting in this way, a desired quantity of water-soluble adhesive particles are reliably present between non-hydrating reaction raw material particles, meaning that water in which water-soluble adhesive particles are dissolved can efficiently pass between non-hydrating reaction raw material particles. Therefore, a lamination-shaped article strength improvement effect can be effectively achieved.

The lamination shaping powder disclosed here may, if necessary, further contain publicly known additives able to be used in three-dimensional shaping powders, such as dispersing agents, thickening agents and printing aids, as long as the advantageous effect of the present invention is not impaired. The content of such additives should be set as appropriate according to the purpose of the additive, and detailed explanations are omitted as this content does not characterize the present invention.

The method for preparing the lamination shaping powder is not particularly limited. For example, components to be contained in the lamination shaping powder may be mixed using a well-known mixing method, such as a PolyMix. Modes for mixing these components are not particularly limited, and it is possible to, for example, mix all of the components at once or mix the components in an appropriately specified order.

The lamination shaping powder disclosed here is typically used to shape a lamination-shaped article in a mode in which the lamination shaping powder is mixed with a water-containing shaping liquid.

A solvent used in the shaping liquid should be a water-containing solvent. Pure water, ultrapure water, ion exchanged water (deionized water), distilled water, and the like, can be advantageously used as the solvent. The shaping liquid disclosed here may, if necessary, further contain an organic solvent (a lower alcohol, a lower ketone, or the like) able to be homogeneously mixed with water. In general, it is preferable for not less than 40 vol. %, and more preferably not less than 50 vol. % (typically, 50 to 100 vol. %), of the solvent contained in the shaping liquid to be water. This type of shaping liquid can be mixed at a proportion of, for example, 20 to 80 parts by mass (typically 40 to 60 parts by mass) relative to 100 parts by mass of a three-dimensional shaping powder when carrying out shaping.

The shaping liquid disclosed here may, if necessary, further contain publicly known additives able to be used in shaping liquids, such as dyes, organic pigments, inorganic pigments, wetting agents and flow rate-increasing agents, as long as the advantageous effect of the present invention is not impaired. The content of such additives should be set as appropriate according to the purpose of the additive, and detailed explanations are omitted as this content does not characterize the present invention.

The method for shaping the lamination-shaped article using the lamination shaping powder is not particularly limited. For example, the lamination-shaped article can be shaped by forming a layer of the lamination shaping powder and then supplying a water-containing shaping liquid to a prescribed region of the layer. This shaping may be carried out using a 3D printer that shapes a three-dimensional body on the basis of three-dimensional data corresponding to a lamination-shaped article to be shaped. This type of 3D printer may have inkjets that apply droplets of the water-containing shaping liquid and a platen on which the lamination shaping powder is disposed.

The lamination-shaped article is then shaped by repeating procedures 1 to 3 below so as to successively laminate solid layered articles.

Procedure 1: the lamination shaping powder is packed (deposited) in the form of a layer on the platen at a thickness corresponding to the thickness of a layer of the lamination-shaped article to be shaped (for example, 0.01 to 0.3 mm).

Procedure 2: droplets of the water-containing shaping liquid are applied from the inkjets to that part of the lamination shaping powder (deposit) packed in the form of a layer that is to be hardened (that is, a part corresponding to a portion of the lamination-shaped article to be shaped). Next, a hardened layer (a solid layered article) is formed by dissolving water-soluble adhesive particles contained in the applied droplets and bonding non-hydrating reaction raw material particles to each other.

Procedure 3: the platen is lowered vertically by an amount corresponding to the thickness of a layer in the lamination-shaped article.

Next, shaping of the lamination-shaped article is completed by finally removing un-hardened lamination shaping powder. This lamination-shaped article is formed by a multiplicity of non-hydrating reaction raw material particles being bonded to each other by dissolved water-soluble adhesive particles, and may have a porous structure. Following the shaping, the obtained lamination-shaped article may be allowed to dry naturally. The drying time is not particularly limited, but is generally 1.5 to 24 hours, and preferably 15 to 20 hours.

Impregnation Step

In the impregnation step of step S20, the lamination-shaped article shaped in the shaping step (typically gaps between non-hydrating reaction raw material particles that constitute the lamination-shaped article) is impregnated with a coupling liquid that contains a coupling agent.

The coupling agent contained in the coupling liquid can be a compound that contains a metal element (This is a concept that encompasses metalloid elements. Hereinafter also). For example, coupling agents constituted mainly from silane-based coupling agents that contain silicon (Si), aluminum-based coupling agents that contain aluminum (Al), titanium-based coupling agents that contain titanium (Ti) and zirconium-based coupling agents that contain zirconium (Zr) can be advantageously used.

A silane-based coupling agent can be, for example, a compound in which one molecule is formed by a hydrophilic organic functional group and a hydrophobic organic functional group being bonded via silicon (Si). Examples of organic functional groups include alkoxy groups (for example, alkoxy groups having 1 to 4 carbon atoms, typically methoxy groups and ethoxy groups), vinyl groups, epoxy groups, styryl groups, methacrylic groups, acrylic groups, amino groups, isocyanate groups, ureido groups, mercapto groups and sulfide groups. A silane-based coupling agent having an alkoxy group and an organic functional group other than an alkoxy group in a single molecule is preferred. Of these, a silane-based coupling agent having an alkoxy group and an epoxy group or amino group in a single molecule is preferred.

Preferred examples of silane-based coupling agents include epoxyalkoxysilanes such as 3-glycidoxypropyltrimethoxysilane, 3-glycidoxypropylmethyldiethoxysilane, 3-glycidoxypropyltriethoxysilane, 3-glycidoxypropylmethyldimethoxysilane and 2-(3,4-epoxycyclohexyl)ethyltrimethoxysilane; and aminoalkoxysilanes such as 3-aminopropyltriethoxysilane, 3-aminopropyldimethylethoxysilane, 3-aminopropyltrimethoxysilane, 3-aminotriethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-triethoxysilyl-N-(1,3-dimethyl-butylidene)propylamine, N-phenyl-3-aminopropyltrimethoxysilane and N-(vinylbenzyl)-2-aminoethyl-3-aminopropyltrimethoxysilane hydrochloride. Of these, 3-glycidoxypropyltriethoxysilane, 3-aminopropyltriethoxysilane and 3-aminopropyldimethylethoxysilane are preferred, and 3-aminopropyltrimethoxysilane is particularly preferred from perspectives such as further increasing the mechanical strength of a lamination-shaped fired body.

Other examples of silane-based coupling agents include vinylalkoxysilanes such as vinyltrichlorosilane, vinyltrimethoxysilane and vinyltricthoxysilane; styrylalkoxysilanes such as p-styryltrimethoxysilane; methacrylic alkoxysilanes such as 3-methacryloxypropylmethyldimethoxysilane, 3-methacryloxypropyltrimethoxysilane, 3-methacryloxypropylmethyldiethoxysilane and 3-methacryloxypropyltriethoxysilane; acrylic alkoxysilanes such as 3-acryloxypropyltrimethoxysilane; ureidoalkoxysilanes such as 3-ureidopropyltriethoxysilane; mercaptoalkoxysilanes such as 3-mercaptopropylmethyldimethoxysilane and 3-mercaptopropyltrimethoxysilane; sulfide alkoxysilanes such as bis(triethoxysilylpropyl)tetrasulfide: isocyanate alkoxysilanes such as 3-isocyanatopropyltriethoxysilane; isocyanurate alkoxysilanes such as tris-(trimethoxysilylpropyl)isocyanurate; 3-chloropropyltrimethoxysilane, tetramethoxysilane, tetraethoxysilane, methyltrimethoxysilane, methyltriethoxysilane, dimethyltriethoxysilane, phenyltriethoxysilane, hexamethyldisilazane, hexyltrimethoxysilane, decyltrimethoxysilane, butyltrichlorosilane, cyclohexyltrichlorosilane, decyltrichlorosilane, dodecyltrichlorosilane, octyltrichlorosilane, octadecyltrichlorosilane and tetradecyltrichlorosilane. It is possible to use one of these silane-based coupling agents in isolation, or a combination of two or more types thereof.

An aluminum-based coupling agent can be, for example, a compound in which one molecule is formed by a hydrophilic organic functional group and a hydrophobic organic functional group being bonded via aluminum (Al). Preferred examples of aluminum-based coupling agents include cyclic aluminum oxide octylate, cyclic aluminum oxide isopropylate, cyclic aluminum oxide stearate, acetoalkoxy aluminum diisopropylates, aluminum acetylacetonate, aluminum trimethoxide, aluminum tris(acetylacetonate), aluminum tris (ethylacetoacetate), aluminum diisopropoxymonoethylacetoacetate, aluminum isopropylate, mono-sec-butoxy aluminum diisopropylate, ethylacetoacetate aluminum diisopropylate, alkylacetoacetate aluminum diisopropylates, aluminum sec-butyrate, aluminum ethylate, aluminum tris (ethylacetoacetate), aluminum monoacetylacetonate-bis (ethylacetoacetate), aluminum tris(acetylacetonate) and aluminum monoisopropoxy-monooleoxyethylacetoacetate. Of these, cyclic aluminum oxide octylate and acetoalkoxy aluminum diisopropylates are preferred from perspectives such as further increasing the mechanical strength of a lamination-shaped fired body. It is possible to use one of these aluminum-based coupling agents in isolation, or a combination of two or more types thereof.

A titanium-based coupling agent can be, for example, a compound in which one molecule is formed by a hydrophilic organic functional group and a hydrophobic organic functional group being bonded via titanium (Ti). Preferred examples of titanium-based coupling agents include tetraoctyl-bis(di-tridecylphosphite) titanate, isopropyl-tris(dioctylpyrophosphatc) titanate, tetraisopropyl-bis(dioctylphosphite) titanate, tetra(2,2-diallyloxymethyl)-bis(di-tridecyl) phosphite titanate, bis(dioctylpyrophosphate)oxyacetate titanate, bis(dioctylpyrophosphate)ethylene titanate, isopropyltriisostearoyl titanate, isopropyltri-dodecylbenzenesulfonyl titanate, isopropyltrioctanoyl titanate, isopropyldimethacrylisostearoyl titanate, isopropylisostearoyldiacrylic titanate, isopropyl-tri(dioctylphosphate) titanate, isopropyl-tricumylphenyl titanate, isopropyl-tri(N-aminoethyl-aminoethyl) titanate, dicumylphenyloxyacetate titanate, diisostearoylethylene titanate, isopropyltristearoyl titanate, tetra(2,2-diallyloxymethyl-1-butyl)-bis(di-tridecylphosphite) titanate, bis(dioctylpyrophosphate)diisopropyl titanate, tetramethyl ortho-titanate, tetraethyl ortho-titanate, tetrapropyl ortho-titanate, tetraisopropyltetraethyl ortho-titanate, tetrabutyl ortho-titanate, butyl polytitanate, tetraisobutyl ortho-titanate, 2-ethylhexyl titanate and stearyl titanate. Of these, tetraoctyl-bis(di-tridecylphosphite) titanate is preferred from perspectives such as further increasing the mechanical strength of a lamination-shaped fired body. It is possible to use one of these titanium-based coupling agents in isolation, or a combination of two or more types thereof.

A zirconium-based coupling agent can be, for example, a compound in which one molecule is formed by a hydrophilic organic functional group and a hydrophobic organic functional group being bonded via zirconium (Zr). Preferred examples of zirconium-based coupling agents include a 1-butanol solution of zirconium (IV) butoxide, tetra-n-propoxy zirconium, tetra-butoxy zirconium, zirconium tetraacetylacetonate, zirconium dibutoxy-bis(acetylacetonate), zirconium tributoxyethylacetoacetate, zirconium butoxyacetylacetonate-bis(ethylacetoacetate), tetra-n-propoxy zirconium, tetra-n-butoxy zirconium, zirconium tributoxy-acetylacetonate, zirconium tributoxystearate, zirconium monobutoxyacetylacetonate-bis(ethylacetoacetate), neoalkoxy-tris(neodecanoyl) zirconates, neoalkoxy-tris(dodecyl)benzenesulfonyl zirconates, neoalkoxy-tris(dioctyl) phosphate zirconates, neoalkoxy-tris(dioctyl)pyrophosphate zirconates, neoalkoxy-tris(ethylenediamino)ethyl zirconates, neoalkoxy-tris(m-amino)phenyl zirconates, tetra(2,2-diallyloxymethyl)butyl, di(di-tridecyl)phosphite zirconate, neopentyl(diallyl)oxy, trineodecanoyl zirconate, neopentyl (diallyl)oxy, tri(dodecyl)benzene-sulfonyl zirconate and neopentyl(diallyl)oxy, tri(dioctyl)phosphite zirconate. Of these, a 1-butanol solution of zirconium (IV) butoxide is preferred from perspectives such as further increasing the mechanical strength of a lamination-shaped fired body. It is possible to use one of these zirconium-based coupling agents in isolation, or a combination of two or more types thereof.

The content of the coupling agent in the coupling liquid is not particularly limited, but a content of 50 to 100 mass % is typically suitable, and a content of 85 to 100 mass % is preferred.

The coupling liquid disclosed here may contain a non-aqueous solvent in addition to the coupling agent. The non-aqueous solvent used in the coupling liquid should be able to disperse or dissolve the coupling agents mentioned above and is not particularly limited, and aromatic hydrocarbon solvents such as toluene and xylene: aliphatic hydrocarbon solvents such as n-hexane and n-pentane; ketone-based solvents such as acetone, methyl ethyl ketone, methyl isobutyl ketone and cyclohexanone; ether-based solvents such as dioxane, diethyl ether, isopropyl ether and tetrahydrofuran; ester-based solvents such as ethyl acetate, butyl acetate and isobutyl acetate: glycol ether ester-based solvents such as ethylene glycol ethyl ether acetate, propylene glycol methyl ether acetate, 3-methyl-3-methoxybutyl acetate and ethyl-3-ethoxypropionate; and alcohol-based solvents such as methanol, ethanol, 1-propanol, tert-butanol and 2-ethylhexanol can be advantageously used as non-aqueous solvents. It is possible to use one of these organic solvents in isolation, or a combination of two or more types thereof. It is possible to use a coupling liquid that contains substantially none of these organic solvents.

The method for impregnating the lamination-shaped article with the coupling liquid that contains a coupling agent is not particularly limited. For example, it is possible to use a method of immersing the lamination-shaped article in the coupling liquid so as to impregnate the lamination-shaped article with the coupling liquid or a method of applying the coupling liquid to the lamination-shaped article so as to impregnate the lamination-shaped article with the coupling liquid. In cases where the lamination-shaped article is immersed in the coupling liquid, the immersion time should be a time by which the coupling liquid can adequately penetrate into gaps between non-hydrating reaction raw material particles, and this time is generally 30 to 600 seconds, preferably 40 to 300 seconds, and more preferably 50 to 120 seconds. The lamination-shaped article is removed from the coupling liquid, and may then be allowed to dry naturally before being fired. The drying time is not particularly limited, but is generally 1 to 10 hours, and preferably 2 to 5 hours.

Firing Step

In the firing step of step S30, a lamination-shaped fired body is obtained by firing the lamination-shaped article after the impregnation step. It is preferable to set the maximum firing temperature to fall within the range 600° C. to 1650° C. in an oxygen atmosphere. In this way, the coupling agent and water-soluble adhesive resin impregnated in the lamination-shaped article are removed through pyrolysis, and sintering of non-hydrating reaction raw material particles occurs in an effective manner via metal elements in the coupling agent. Therefore, it is possible to produce a lamination-shaped fired body having higher strength. It is preferable to carry out the firing at a maximum firing temperature of not less than 1250° C. (and preferably 1300° ° C. to 1500° C., for example 1350° C. to 1450° C.). In addition, the firing time (the firing time at the maximum firing temperature) should generally be 1 to 10 hours (preferably 1.5 to 5 hours, and particularly preferably 2 to 3 hours). If the firing time is too short, insufficient sintering occurs, meaning that the mechanical strength of the lamination-shaped fired body may deteriorate, but if the firing time is too long, the mechanical strength improvement effect tends to stagnate and the time required for production increases, which is a disadvantage.

In a preferred aspect, the firing step is carried out by increasing the temperature from room temperature to the maximum firing temperature at a fixed ramp rate, holding at the maximum firing temperature for a prescribed period of time, and then decreasing the temperature to room temperature at a fixed ramp down rate. The ramp rate is not particularly limited, but is generally 0.1 to 10° C./min, and preferably 1 to 10° C./min. In addition, the ramp down rate is not particularly limited, but is generally 0.1 to 50° C./min, and preferably 1 to 10° C./min. By firing the lamination-shaped article using this type of firing schedule, a lamination-shaped fired body having high strength can be stably obtained. Production of a lamination-shaped fired body according to the present embodiment is completed in this way.

Lamination-Shaped Fired Body

The lamination-shaped fired body disclosed here is produced by means of a shaping step of shaping a lamination-shaped article using a lamination shaping powder that contains non-hydrating reaction raw material particles, an impregnation step of impregnating the lamination-shaped article with a coupling liquid that contains a coupling agent and, following the impregnation step, a firing step of firing the lamination-shaped article so as to obtain a lamination-shaped fired body. As a result, the obtained lamination-shaped fired body can have superior mechanical strength to the prior art. Typically, the three-point bending strength of the lamination-shaped fired body, as measured in accordance with JIS R 1601, is not less than 0.5 MPa (for example 0.5 to 20 MPa), preferably not less than 0.6 MPa, more preferably not less than 0.8 MPa, further preferably not less than 2 MPa, and particularly preferably not less than 3 MPa (for example, not less than 5 MPa, and typically not less than 8 MPa).

In the lamination-shaped fired body disclosed here, a metal oxide is generated at a suitable temperature following pyrolysis of metal elements in the coupling agent in the firing step. As a result, a metal oxide derived from metal elements in the coupling agent (for example, $SiO_2$, $Al_2O_3$, $TiO_2$ or $ZrO_2$) is present at grain boundaries between non-hydrating reaction raw material particles that constitute the lamination-shaped fired body. Preferred examples of the lamination-shaped fired body disclosed here include a lamination-shaped fired body in which the non-hydrating reaction raw material particles contain at least one element selected from among Al, Zr, Ti, Zn, Ni, Fe and Si and in which an oxide containing at least one element selected from among Si, Ti, Al and Zr, other than those elements contained in the non-hydrating reaction raw material particles, is present at grain boundaries between non-hydrating reaction raw material particles; a lamination-shaped fired body in which the non-hydrating reaction raw material particles contain Al and in which an oxide containing at least one element selected from among Si, Ti and Zr is present at grain boundaries between non-hydrating reaction raw material particles; a lamination-shaped fired body in which the non-hydrating reaction raw material particles contain Zr and in which an oxide containing at least one element selected from among Si, Al and Ti is present at grain boundaries between non-hydrating reaction raw material particles: a lamination-shaped fired body in which the non-hydrating reaction raw material particles contain Si and in which an oxide containing at least one element selected from among Ti, Al and Zr is present at grain boundaries between non-hydrating reaction raw material particles; and a lamination-shaped fired body in which the non-hydrating reaction raw material particles contain Ti and in which an oxide containing at least one element selected from among Si, Al and Zr is present at grain boundaries between non-hydrating reaction raw material particles. As a result of a metal oxide derived from metal elements contained in the coupling agent being present at grain boundaries between non-hydrating reaction raw material particles, it is possible to achieve a high strength lamination-shaped fired body, which could not be obtained in the past. Moreover, the presence of a metal oxide derived from metal elements contained in the coupling agent at grain boundaries between non-hydrating reaction raw material particles can be confirmed by elemental analysis carried out by, for example, an energy dispersion type X-ray spectroscopy method (EDX, for example SEM-EDX).

Kit for Producing Lamination-Shaped Fired Body

The invention disclosed here encompasses provision of, for example, a kit able to be used to produce the lamination-shaped fired body described above. That is, the invention disclosed here provides a kit for producing a lamination-shaped fired body obtained by firing a lamination-shaped article. This production kit includes a lamination shaping powder that contains non-hydrating reaction raw material particles, and a coupling liquid which contains a coupling agent and which is impregnated in an unfired lamination-shaped article that is shaped using the lamination shaping powder. This production kit can be advantageously used in a method for producing the lamination-shaped fired body disclosed here. According to this production kit, a high quality lamination-shaped fired body having superior mechanical strength to the prior art can be produced.

Several working examples relating to the present invention will now be explained, but the present invention is in no way limited to these working examples.

A lamination shaping powder was prepared by weighing out non-hydrating reaction raw material particles and PVA as water-soluble adhesive particles at a mass ratio of 90:10 and mixing for 30 seconds using a PolyMix. This lamination shaping powder was introduced into a ProJet 460 Plus available from 3D Systems, Inc., shaped into a lamination-shaped article (a test piece) having a height of 4 mm, a width of 40 mm and a thickness of 3 mm, and allowed to dry for 16 hours at room temperature. In addition, a coupling liquid containing a coupling agent was prepared, and the shaped lamination-shaped article was immersed for 1 minute in the coupling liquid so as to impregnate the lamination-shaped article with the coupling liquid. The lamination-shaped article was then removed from the coupling liquid and allowed to dry naturally for 3 hours on a paper towel. A lamination-shaped fired body was then obtained by firing the impregnated lamination-shaped article by increasing the temperature to 1400° ° C. at a ramp rate of 2° C./min in an air atmosphere, maintaining a temperature of 1400° ° C. for 2 hours, and then reducing the temperature to room temperature at a ramp down rate of 2° C./min. The types of non-hydrating reaction raw material particles and coupling agent used in the lamination-shaped fired bodies of the examples are shown in Tables 1 and 2. Moreover, for purposes of comparison, lamination-shaped articles were fired without being impregnated with a coupling liquid in Comparative Examples 1 and 2.

TABLE 1

| | Non-hydrating reaction raw material particles | Coupling agent | Strength (MPa) |
|---|---|---|---|
| Working Example 1 | Alumina | 3-aminopropyltriethoxysilane | 8.41 |
| Working Example 2 | Alumina | 3-aminopropyldimethylethoxysilane | 2.14 |
| Working Example 3 | Alumina | 3-glycidoxypropyltriethoxysilane | 5.26 |
| Working Example 4 | Alumina | 60% petroleum solution of cyclic aluminum oxide octylate | 0.9 |
| Working Example 5 | Alumina | Acetoalkoxy aluminum diisopropylate | 0.68 |
| Working Example 6 | Alumina | Tetraoctyl-bis(di-tridecylphosphite) titanate | 3.33 |
| Working Example 7 | Alumina | 85% 1-butanol solution of zirconium (IV) butoxide | 0.69 |
| Comparative Example 1 | Alumina | None | 0.41 |

TABLE 2

| | Non-hydrating reaction raw material particles | Coupling agent | Strength (MPa) |
|---|---|---|---|
| Working Example 8 | Zirconia | 3-aminopropyltriethoxysilane | 2.11 |
| Working Example 9 | Zirconia | Acetoalkoxy aluminum diisopropylate | 0.88 |
| Working Example 10 | Zirconia | Tetraoctyl-bis(di-tridecylphosphite) titanate | 0.61 |
| Comparative Example 2 | Zirconia | None | 0.34 |

The three-point bending strength (crushing strength) of the lamination-shaped fired bodies obtained in the examples was measured using a method according to JIS R 1601. The results are shown in the "Strength (MPa)" column in Tables 1 and 2.

As shown in Table 1, the lamination-shaped fired bodies of Working Examples 1 to 7, which were obtained by impregnating a lamination-shaped article with a coupling liquid and then firing, achieved better results in terms of three-point bending strength than Comparative Example 1, which was obtained by firing a lamination-shaped article without impregnating a coupling liquid. From these results, it can be confirmed that a lamination-shaped fired body having excellent mechanical strength can be obtained by impregnating a lamination-shaped article with a coupling liquid and then firing. In the case of the lamination-shaped fired bodies tested here, Working Examples 1 to 3, which were obtained using a silane-based coupling agent, achieved better results in terms of three-point bending strength than Working Examples 4 to 5 and 7, which were obtained using other coupling agents.

Moreover, the lamination-shaped fired bodies of Working Examples 8 to 10, which were obtained using zirconia instead of alumina, like the lamination-shaped fired bodies of Working Examples 1 to 7, which were obtained using alumina, achieved better results in terms of three-point bending strength than Comparative Example 2, which was obtained by firing a lamination-shaped article without impregnating a coupling liquid. From these results, it was confirmed that a performance improvement effect (a mechanical strength improvement effect) achieved by impregnating a lamination-shaped article with a coupling liquid and then firing was achieved regardless of the type of non-hydrating reaction raw material particles used.

Specific examples of the present invention have been explained in detail above, but these are merely examples, and do not limit the scope of the invention. The features described in the claims can include aspects obtained by variously modifying or altering the specific examples shown above.

What is claimed is:

1. A method for producing a lamination-shaped fired body,
    the method comprising:
    a shaping step of shaping a lamination-shaped article by using a lamination shaping powder that contains non-hydrating reaction raw material particles but does not contain any coupling liquid;
    an impregnation step of impregnating the shaped lamination-shaped article with a coupling liquid that contains a coupling agent, wherein the coupling agent contains Ti, Al or Zr; and
    a firing step of firing the shaped lamination-shaped article so as to obtain a lamination-shaped fired body, the firing step implemented following the impregnation step.

2. The method for producing a lamination-shaped fired body according to claim 1, wherein the non-hydrating reaction raw material particles are constituted from a metal containing at least one element selected from the group consisting of Al, Zr, Ti, Zn, Ni and Fe or an alloy thereof.

3. The method for producing a lamination-shaped fired body according to claim 1, wherein the non-hydrating reaction raw material particles are constituted mainly from an oxide containing at least one element selected from the group consisting of Al, Zr, Ti, Zn, Ni, Fe and Si.

4. The method for producing a lamination-shaped fired body according to claim 1, wherein
    the lamination shaping powder further contains water-soluble adhesive particles, and
    the shaping step includes processing of supplying a water-containing shaping liquid to a deposit of the lamination shaping powder so as to form a hardened layer.

5. The method for producing a lamination-shaped fired body according to claim 4, wherein the water-soluble adhesive particles comprise poly(vinyl alcohol) or a derivative thereof.

* * * * *